US012168938B2

(12) United States Patent
Fredette et al.

(10) Patent No.: US 12,168,938 B2
(45) Date of Patent: Dec. 17, 2024

(54) HIGH PRESSURE TURBINE VANE COOLING CONFIGURATION

(71) Applicant: RTX Corporation, Farmington, CT (US)

(72) Inventors: Jeremy B. Fredette, Hebron, CT (US); Robin Michael Patrick Prenter, St. Augustine, FL (US); Dominic J. Mongillo, Jr., West Hartford, CT (US); Christopher Parent, South Windsor, CT (US); Vladimir Skidelsky, West Hartford, CT (US); Domenico Valerio, Waterbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/458,898

(22) Filed: Aug. 30, 2023

(65) Prior Publication Data

US 2024/0218796 A1 Jul. 4, 2024

Related U.S. Application Data

(60) Provisional application No. 63/421,059, filed on Oct. 31, 2022.

(51) Int. Cl.
*F01D 5/18* (2006.01)

(52) U.S. Cl.
CPC .......... *F01D 5/186* (2013.01); *F05D 2240/81* (2013.01); *F05D 2260/202* (2013.01)

(58) Field of Classification Search
CPC . F01D 5/186; F05D 2240/81; F05D 2260/202
See application file for complete search history.

(56) References Cited

U.S. PATENT DOCUMENTS 9,322,279 B2 * 4/2016 Spangler ................ F01D 9/065
9,957,894 B2 5/2018 Deibel et al.
10,107,140 B2 10/2018 Ennacer et al.
10,648,363 B2 5/2020 McMahon et al.
2013/0164116 A1 6/2013 Tardif et al.
2014/0010632 A1 * 1/2014 Spangler ................ F01D 9/065 415/115
2015/0211376 A1 7/2015 Riley et al.
2018/0106156 A1 * 4/2018 LoRicco ................ F01D 9/065

OTHER PUBLICATIONS

International Searching Authority; International Search Report and Written Opinion filed in PCT/US23/36237 dated Feb. 13, 2024.

* cited by examiner

*Primary Examiner* — Eldon T Brockman
(74) *Attorney, Agent, or Firm* — SNELL & WILMER L.L.P.

(57) ABSTRACT

A turbine vane assembly for a gas turbine engine is disclosed herein. The turbine vane assembly includes a turbine vane including a leading edge, a pressure edge, a suction edge, and a trailing edge, a core defined by the turbine vane, an outer platform end wall connected to the turbine vane, the outer platform end wall defining an interior space, the interior space being in fluid communication with the core, and a plurality of cooling holes formed in the turbine vane, the plurality of cooling holes being in fluid communication with the core.

18 Claims, 6 Drawing Sheets

HIGH PRESSURE TURBINE VANE COOLING CONFIGURATION

CROSS REFERENCE TO RELATED APPLICATIONS

This application claims priority to, and the benefit of, U.S. Provisional Application No. 63/421,059 filed on Oct. 31, 2022, and titled "High Pressure Turbine Vane Cooling Configuration," which is incorporated by reference herein in its entirety for all purposes.

FIELD

The present disclosure relates to gas turbine engines and, more particularly, to systems and methods used to cool airfoils within gas turbine engines.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section.

Turbine section components, such as turbine blades and vanes, are operated in high temperature environments. To avoid deterioration in the components resulting from their exposure to high temperatures, cooling circuits are typically employed within the components. Turbine blades and vanes are subjected to high thermal loads on both the suction and pressure sides of the airfoil portions and at both the leading and trailing edges. The regions of the airfoils having the highest thermal loads can differ depending on engine design and specific operating conditions.

Turbine components in gas turbine engines often utilize active cooling as temperatures in the gas path exceed the melting point of the constituent components. However, as energy is expended to pressurize coolant flow prior to being used to cool components, the result of adding cooling flow decreases the efficiency of the turbine. Therefore, when designing turbine components, cooling flow should be used sparingly to meet part and module life targets to be within performance targets.

SUMMARY

A turbine vane assembly for a gas turbine engine is disclosed herein. The turbine vane assembly includes a turbine vane including a leading edge, a pressure edge, a suction edge, and a trailing edge, a core defined by the turbine vane, an outer platform end wall connected to the turbine vane, the outer platform end wall defining an interior space, the interior space being in fluid communication with the core, and a plurality of cooling holes formed in the turbine vane, the plurality of cooling holes being in fluid communication with the core.

In various embodiments, the turbine vane assembly is a first stage turbine vane assembly of a high pressure turbine of the gas turbine engine. In various embodiments, the turbine vane assembly further includes a second turbine vane including a second leading edge, a second pressure edge, a second suction edge, and a second trailing edge, the second turbine vane connected to the outer platform end wall, a second core defined by the second turbine vane, the second core in being fluid communication with the interior space, and a second plurality of cooling holes formed in the second turbine vane, the second plurality of cooling holes in being fluid communication with the second core.

In various embodiments, the turbine vane assembly further includes an inner platform end wall connected to the turbine vane and the second turbine vane opposite the outer platform end wall, the inner platform end wall defining a second interior space, wherein the second interior space is in fluid communication with the core and the second core. In various embodiments, the turbine vane assembly further includes a third plurality of cooling holes formed in the outer platform end wall, the third plurality of cooling holes being in fluid communication with the interior space.

In various embodiments, the turbine vane assembly further includes a fourth plurality of cooling holes formed in the inner platform end wall, the fourth plurality of cooling holes being in fluid communication with the second interior space. In various embodiments, the fourth plurality of cooling holes are located in the inner platform end wall according to coordinates of Table 4, wherein the coordinates of Table 4 are distances from a point of origin on the turbine vane assembly. In various embodiments, the third plurality of cooling holes are located in the outer platform according to coordinates of Table 3, wherein the coordinates of Table 3 are distances from a point of origin on the turbine vane assembly. In various embodiments, the second plurality of cooling holes are located in the second turbine vane according to coordinates of Table 2, wherein the coordinates of Table 2 are distances from a point of origin on the turbine vane assembly. In various embodiments, the plurality of cooling holes are located in the vane according to coordinates of Table 1, wherein the coordinates of Table 1 are distances from a point of origin on the turbine vane assembly.

Also disclosed herein is a component for a gas turbine engine, including a first turbine vane including first outer walls and a first core, the first core being partially defined by the first outer walls, a second turbine vane including second outer walls and a second core, the second core being partially defined by a the second outer walls, an outer platform end wall connected to the first turbine vane and the second turbine vane, an inner platform end wall connected to the first turbine vane and the second turbine vane opposite the outer platform end wall, a first plurality of cooling holes extending through the first outer walls into the first core, and a second plurality of cooling holes extending through the second outer walls into the second core.

In various embodiments, the outer platform end wall further includes a first interior space, the first interior space being in fluid communication with the first core and the second core and a third plurality of cooling holes extending through the outer platform end wall and into the first interior space. In various embodiments, the third plurality of cooling holes are located in the outer platform end wall according to coordinates of Table 3, wherein the coordinates of Table 3 are distances from a point of origin on the component.

In various embodiments, the inner platform end wall further includes a second interior space, the second interior space being in fluid communication with the first core and the second core and a fourth plurality of cooling holes extending through the inner platform end wall and into the first interior space. In various embodiments, the fourth plurality of cooling holes are located in the inner platform end wall according to coordinates of Table 4, wherein the coordinates of Table 4 are distances from a point of origin on the component.

In various embodiments, the first plurality of cooling holes are located in the first turbine vane according to coordinates of Table 1, wherein the coordinates of Table 1 are distances from a point of origin on the component. In various embodiments, the second plurality of cooling holes are located in the second turbine vane according to coordinates of Table 2, wherein the coordinates of Table 2 are distances from a point of origin on the turbine vane assembly.

Also disclosed herein is a method of cooling a turbine vane assembly of a gas turbine engine. The method includes receiving a turbine vane assembly including a first turbine vane, a second turbine vane, an outer platform end wall, and an inner platform end wall, the first turbine vane disposed adjacent the second turbine vane, the outer platform end wall connected to the first turbine vane and the second turbine vane, and the inner platform end wall connected to the first turbine vane and the second turbine vane opposite the outer platform end wall, forming a first plurality of cooling holes in a first turbine vane, wherein the first plurality of cooling holes are located in the first turbine vane according to coordinates of Table 1, wherein the coordinates of Table 1 are distances from a point of origin in the turbine vane assembly, and forming a second plurality of cooling holes in a second turbine vane that is adjacent the first turbine vane, wherein the second plurality of cooling holes are located in the first turbine vane according to coordinates of Table 2, wherein the coordinates of Table 3 are distances from a point of origin in the turbine vane assembly.

In various embodiments, the method further includes forming a third plurality of cooling holes in the outer platform end wall, wherein the third plurality of cooling holes are located in the outer end wall according to coordinates of Table 3, wherein the coordinates of Table 3 are distances from a point of origin in the turbine vane assembly. In various embodiments, the method further includes forming a fourth plurality of cooling holes in the inner platform end wall, wherein the fourth plurality of cooling holes are located in the inner platform end wall according to coordinates of Table 4, wherein the coordinates of Table 4 are distances from a point of origin in the turbine vane assembly.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein, accordance with various embodiments, is a turbine vane assembly including a right vane, a left vane, an inner platform end wall, and an outer platform end wall. Each surface of the left vane, the right vane, the inner platform end wall, and the outer platform end wall may contain a plurality of cooling holes. In various embodiments, the plurality of cooling holes may break from an interior, or backside, surface of the left vane, right vane, inner platform end wall, and/or outer platform end wall to an exterior gas path side. In various embodiments, each of the plurality of cooling holes may emerge on the external surface in accordance with a defined set of Cartesian coordinate values. In various embodiments, these values may reference dimensions from a specified point within the turbine vane assembly. In various embodiments, the turbine vane assembly as described herein may provide improved durability and/or neutral performance changes as compared to current turbine vane designs.

Figure 1:
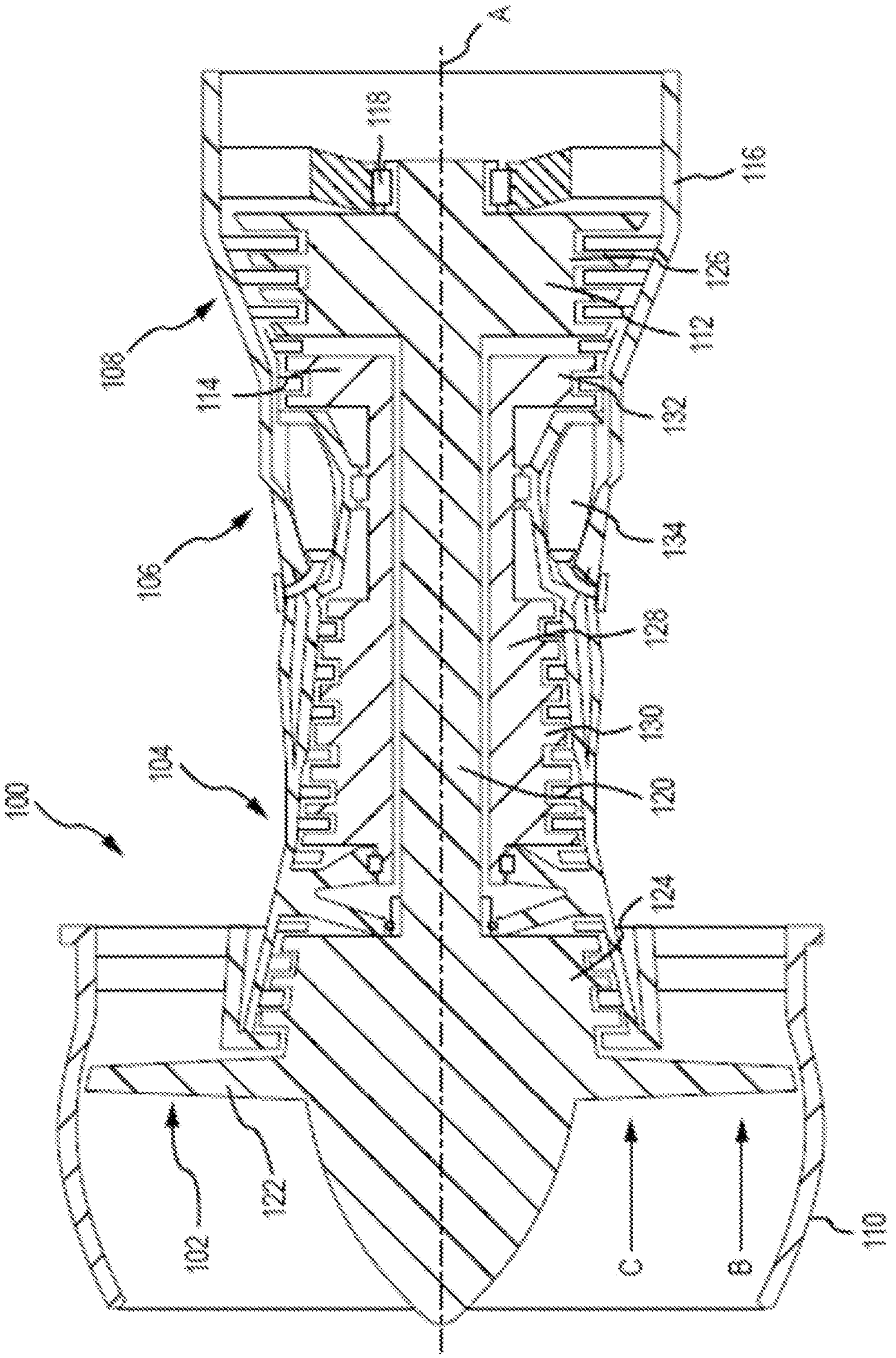
FIG. 1 illustrates a schematic representation of a gas turbine engine, in accordance with various embodiments.

Referring now to FIG. 1, a schematic of a gas turbine engine 100 is illustrated, in accordance with various embodiments. The gas turbine engine 100 is disclosed herein as a two-spool turbofan that generally incorporates a fan section 102, a compressor section 104, a combustor section 106 and a turbine section 108. The fan section 102 drives air along a bypass flow path B in a bypass duct defined within a nacelle 110, while the compressor section 104 drives air along a primary or core flow path C for compression and communication into the combustor section 106 and then expansion through the turbine section 108. Although depicted as a two-spool turbofan gas turbine engine in the disclosed non-limiting embodiment, it will be understood that the concepts described herein are not limited to use with two-spool turbofans, as the teachings may be applied to other types of gas turbine engines, including, for example, architectures having three or more spools or only a single spool.

The gas turbine engine 100 generally includes a low speed spool 112 and a high speed spool 114 mounted for rotation about an engine central longitudinal axis A relative to an engine static structure 116 via several bearing systems 118. It should be understood that various bearing systems at various locations may alternatively or additionally be provided and the location of the several bearing systems 118 may be varied as appropriate to the application. The low speed spool 112 generally includes an inner shaft 120 that interconnects a fan 122, a low pressure compressor 124 and a low pressure turbine 126. The inner shaft 120 may be directly connected to the fan 122 or through a speed change mechanism, such as, for example, a fan drive gear system configured to drive the fan 122 at a lower speed than that of the low speed spool 112. The high speed spool 114 generally includes an outer shaft 128 that interconnects a high pressure compressor 130 and a high pressure turbine 132. A combustor 134 is arranged in the gas turbine engine 100 between the high pressure compressor 130 and the high pressure turbine 132. The inner shaft 120 and the outer shaft 128 are concentric and rotate via the several bearing systems 118 about the engine central longitudinal axis A, which is collinear with longitudinal axes of the inner shaft 120 and the outer shaft 128.

The air in the core flow path C is compressed by the low pressure compressor 124 and then the high pressure compressor 130, mixed and burned with fuel in the combustor 134, and then expanded over the high pressure turbine 132 and the low pressure turbine 126. The low pressure turbine 126 and the high pressure turbine 132 rotationally drive the respective low speed spool 112 and the high speed spool 114 in response to the expansion. It will be appreciated that each of the positions of the fan section 102, the compressor section 104, the combustor section 106, the turbine section 108, and the fan drive gear system, if present, may be varied. For example, the fan drive gear system may be located aft of the combustor section 106 or even aft of the turbine section 108, and the fan section 102 may be positioned forward or aft of the location of the fan drive gear system.

Figure 2A:
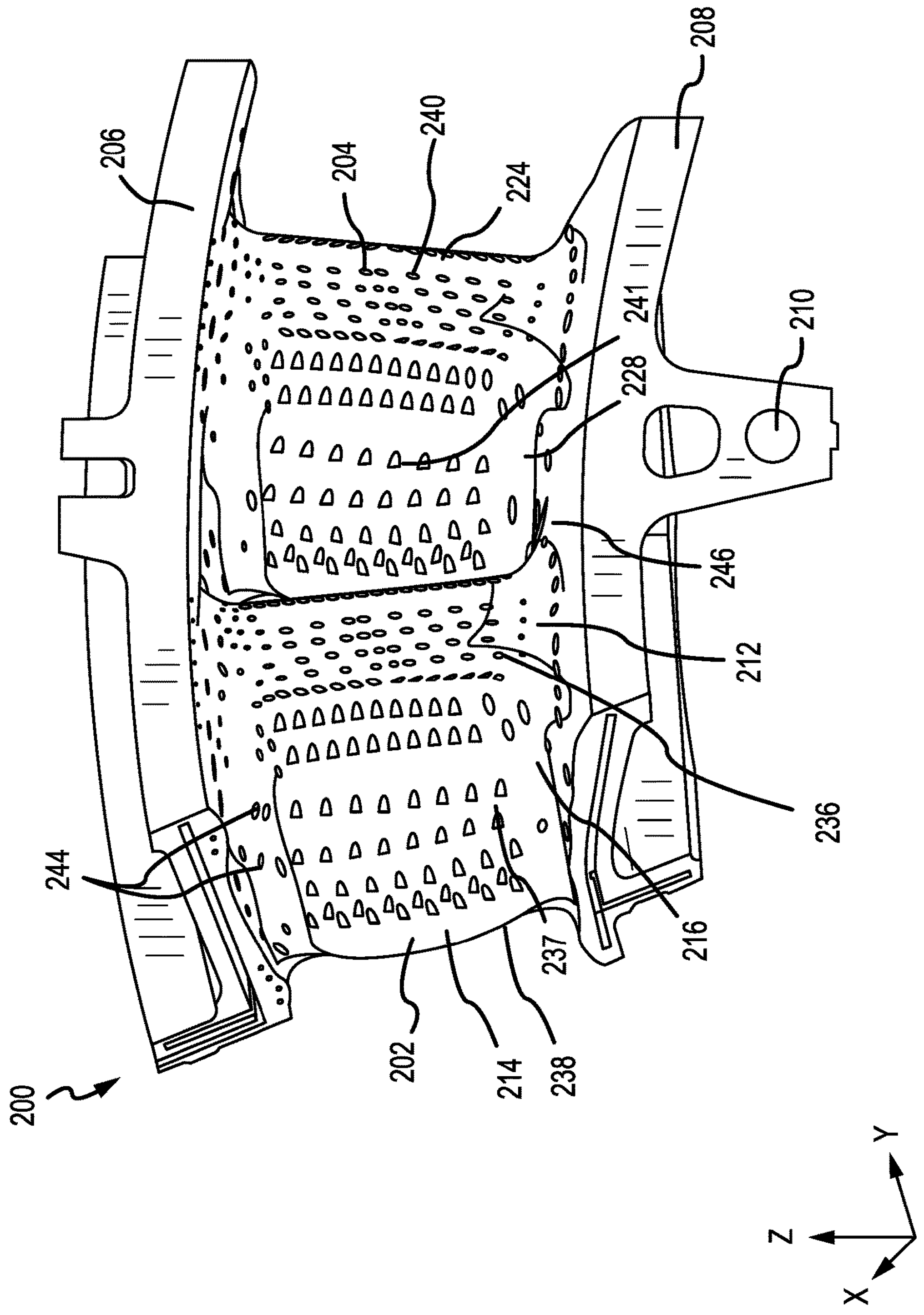
FIGS. 2A, 2B, 2C, 2D, and 2E illustrate a front, back, and cross section views of a vane of a gas turbine engine, in accordance with various embodiments.
Figure 2B:
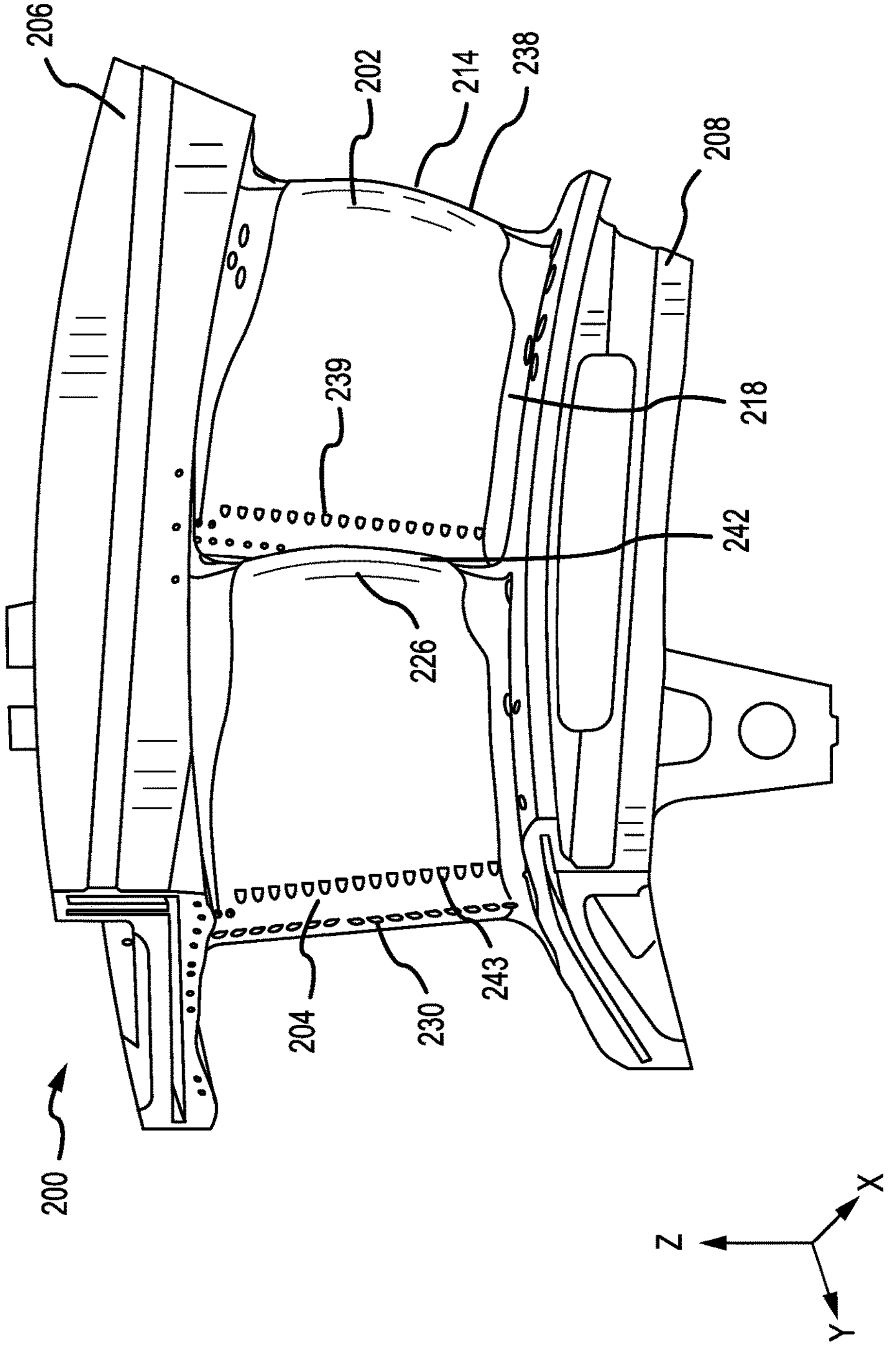
Figure 2C:
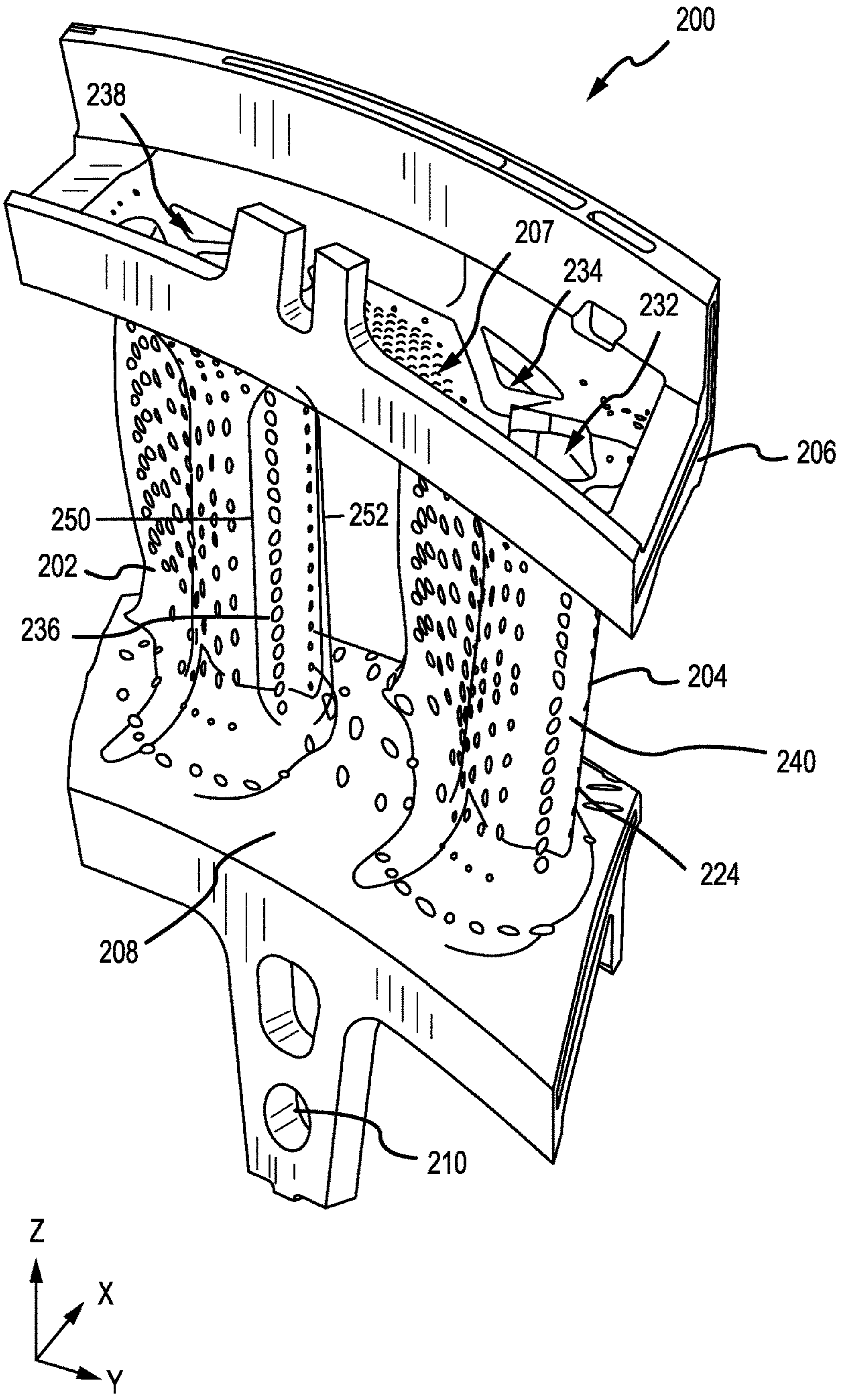
Figure 2D:
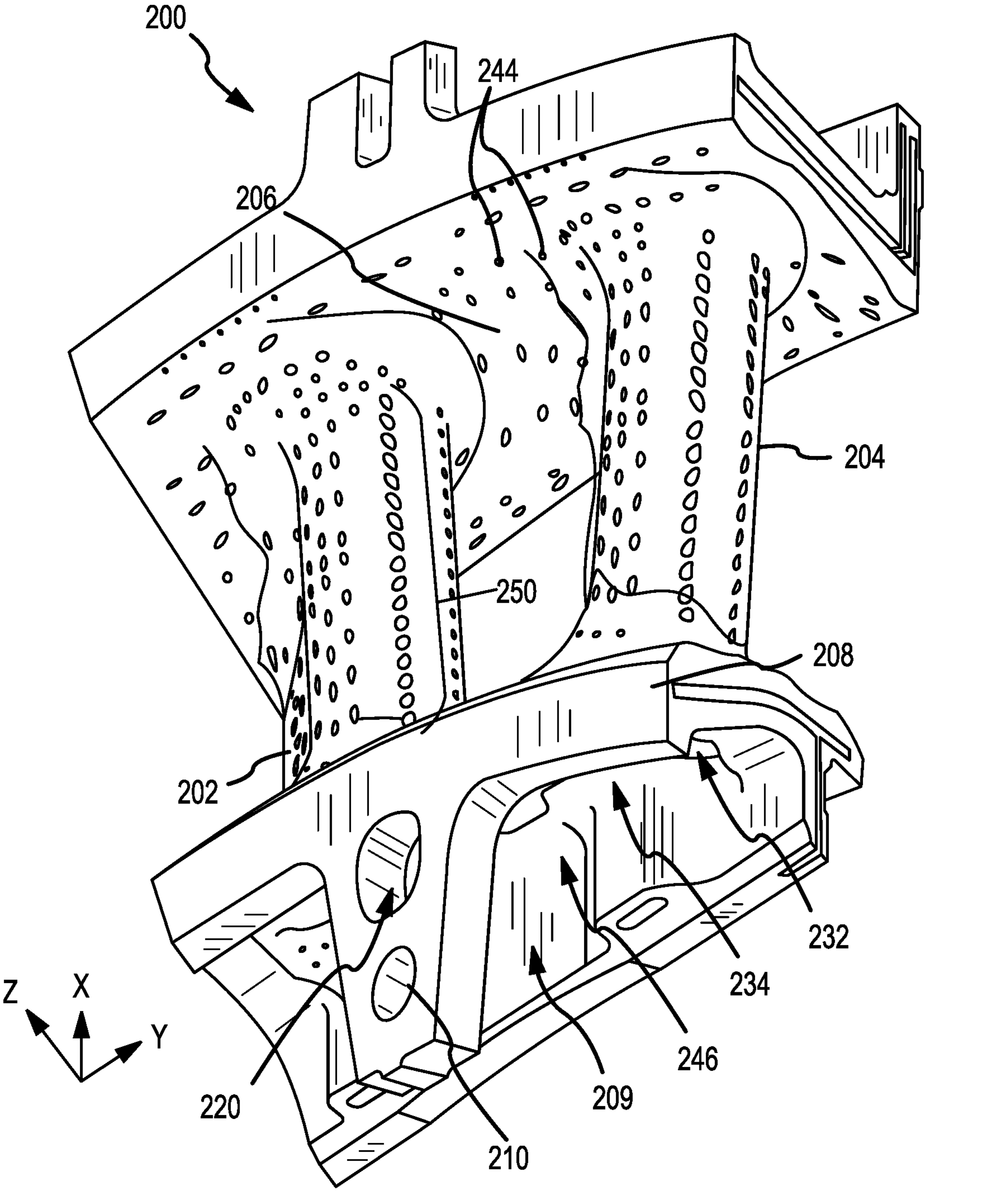
Figure 2E:
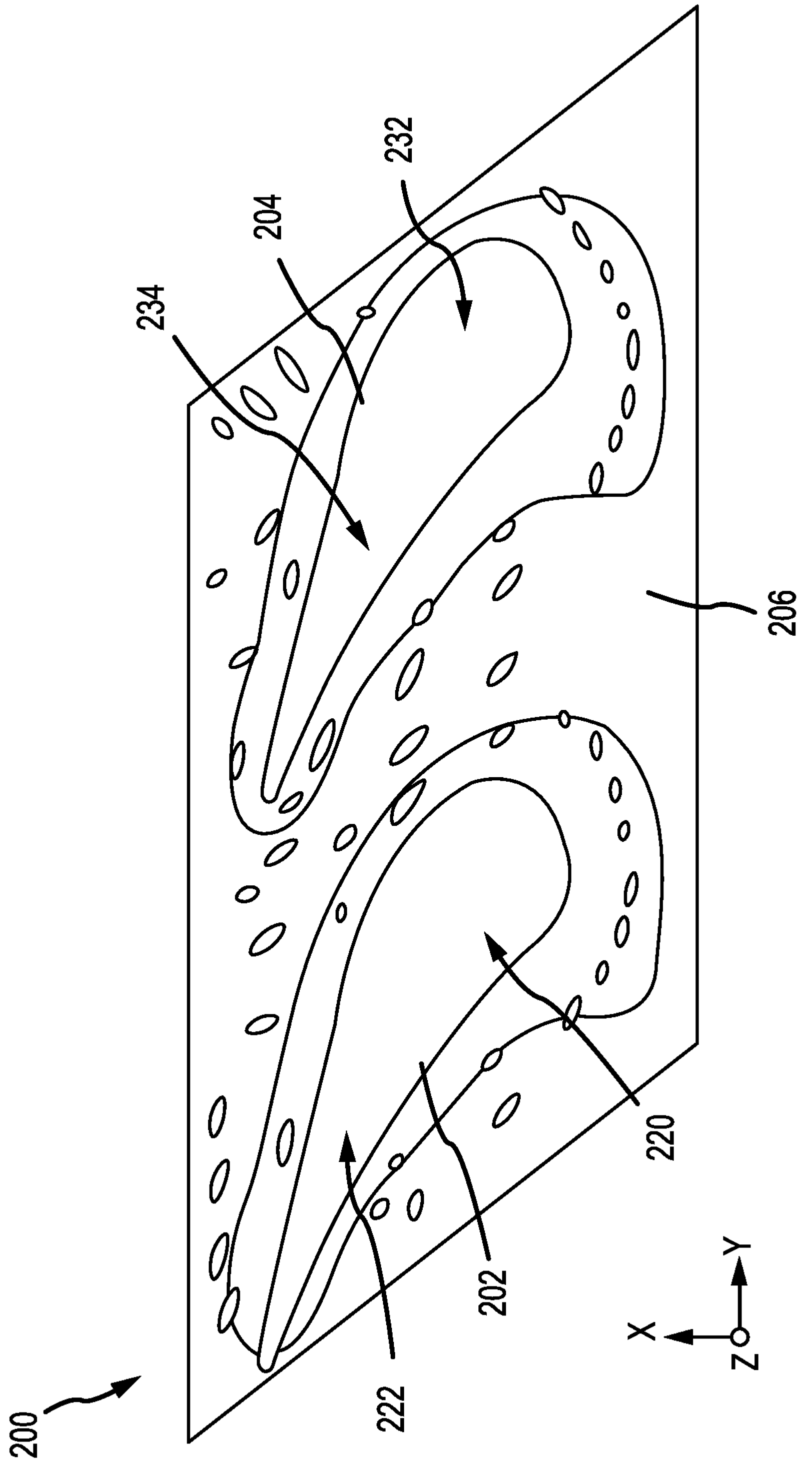

Referring now to FIGS. 2A-2E, front views, a back view, and a cross section view of a turbine vane assembly 200 is schematically illustrated. FIG. 2A illustrates a front perspective view of turbine vane assembly 200. FIG. 2B illustrates a back perspective view of turbine vane assembly 200. FIG. 2C illustrates a front perspective view from a top portion of turbine vane assembly 200. FIG. 2D illustrates a front perspective view from a bottom portion of turbine vane assembly 200. FIG. 2E illustrates a top down cross section view of turbine vane assembly 200. The turbine vane assembly 200 is representative of the vanes present in either of the low pressure turbine 126 and the high pressure turbine 132 described above with reference to FIG. 1. While the present disclosure will be described with respect to its application to a turbine vane, the disclosure could also be utilized in a rotating structure such as a turbine blade (e.g., the turbine blades present in either of the low pressure turbine 126 and the high pressure turbine 132) or other static turbine components such as blade outer air seals, turbine exhaust cases, and struts. Additional uses of the cooling scheme may include combustor liners and flame holders as well as nozzle liners and flaps.

The turbine vane assembly 200 includes a right vane 202, a left vane 204, an outer platform end wall 206, an inner platform end wall 208, and a hole 210. As illustrated in FIGS. 2A-2E, right vane 202 is in the negative y direction and left vane 204 is in y direction. Right vane 202 includes several surfaces including a right leading edge 212, a right trailing edge 214, a right pressure side 216, and a right suction side 218. Right vane 202 further includes a right leading edge core 220 and a right trailing edge core 222 formed therein. Right leading edge 212, right trailing edge 214, right pressure side 216, and right suction side 218 forming an outer wall around right leading edge core 220 and right trailing edge core 222. Right leading edge core 220 and right trailing edge core 222 open into outer platform end wall 206 and inner platform end wall 208. Left vane 204 includes several surfaces including a left leading edge 224, a left trailing edge 226, a left pressure side 228, and a left suction side 230. Left vane 204 further includes a left leading edge core 232 and a left trailing edge core 234 formed therein. Left leading edge 224, left trailing edge 226, left pressure side 228, and left suction side 230 forming an outer wall around left leading edge core 232 and left trailing edge core 234. Left leading edge core 232 and left trailing edge core 234 open into outer platform end wall 206 and inner platform end wall 208. Outer platform end wall 206 defines an outer platform internal space 207 that is in fluid communication with right leading edge core 220, right trailing edge core 222, left leading edge core 232, and left trailing edge core 234. Inner platform end wall defines an inner platform internal space 209 that is in fluid communication with right leading edge core 220, right trailing edge core 222, left leading edge core 232, and left trailing edge core 234.

Each surface of turbine vane assembly 200 (e.g., right vane 202 surfaces, left vane 204 surface, outer platform end wall 206, and inner platform end wall 208) contains a plurality of cooling holes. Right vane 202 includes a plurality of right leading cooling holes 236 along right leading edge 212, a plurality of right pressure side cooling holes 237 along right pressure side 216, and a plurality of right suction cooling holes 239 along right suction side 218. Right vane 202 further includes right trailing cooling holes 238 along right trailing edge 214. Left vane 204 includes a plurality of left leading cooling holes 240 along left leading edge 224, a plurality of left pressure side cooling holes 241 along left pressure side 228, and a plurality of left suction side cooling holes 243 along left suction side 230. Left vane 204 further includes left trailing cooling holes 242 along left trailing edge 226. Outer platform end wall 206 includes a plurality of outer platform cooling holes 244. Inner platform end wall 208 includes a plurality of inner platform cooling holes 246. Each of the plurality of cooling holes (e.g., right leading cooling holes 236, left leading cooling holes 240, etc.) extends through a surface of turbine vane assembly 200 (e.g., right leading edge 212, left trailing edge 226, outer platform end wall 206, etc.) into a interior space (e.g., right leading edge core 220, left trailing edge core 234, outer platform internal space 207, etc.) and break out into an external gas path (e.g., right trailing edge 214, left trailing edge 226, etc.) For example, right leading cooling holes 236 are in fluid communication with right leading edge core 220 and right trailing edge core 222 which are in fluid communication with right trailing cooling holes 238. Gasses pass over right vane 202 and through right leading cooling holes 236, through right leading edge core 220 and/or right trailing edge core 222, and out through right trailing cooling holes 238. As another example, outer platform cooling holes 244 are in fluid communication with outer platform internal space 207 which is in fluid communication with right leading edge core 220, right trailing edge core 222, left leading edge core 232, and left trailing edge core 234. Gasses pass over outer platform end wall 206 and through outer platform cooling holes 244, through outer platform internal space 207, through right leading edge core 220, right trailing edge core 222, left leading edge core 232, and/or left trailing edge core 234, and out through right trailing cooling holes 238 and/or left trailing cooling holes 242. In various embodiments, the gasses may be a cooling fluid CF (e.g., a high-pressure flow of air bled from the compressor section 104 of the gas turbine engine 100 described above with reference to FIG. 1).

In various embodiments, right leading cooling holes 236, right trailing cooling holes 238, left leading cooling holes 240, left trailing cooling holes 242, outer platform cooling holes 244, and inner platform cooling holes 246 (collectively referred to as the cooling holes) may be arranged having different spacings and configurations. In various embodiments, right suction side cooling holes 239 located along right suction side 218 may be arranged in a herring bone pattern 250, as illustrated in FIG. 2C, for example. Herring bone pattern 250 may be symmetrical about a midpoint in the z-axis with an upper portion of the cooling holes above the midpoint pointing upward (e.g., the z-direction) and a lower portion of the cooling holes below the midpoint pointing downward (e.g., the negative z-direction). In various embodiments, herring bone 250 pattern may be duplicated as a second herring bone pattern 252. In various embodiments, a first plurality of right leading cooling holes 236 may be formed at an angle to the surface (e.g., right pressure side 216, right suction side 218, etc.). As a result of the design and arrangement of right leading cooling holes 236, right trailing cooling holes 238, left leading cooling holes 240, left trailing cooling holes 242, outer platform cooling holes 244, and inner platform cooling holes 246, turbine vane assembly 200 may provide improved durability and/or neutral performance changes as compared to current turbine vane designs. Additionally, the design and arrangement of the cooling holes reduces potential hots spots on turbine vane assembly 200 by promoting laminar flow across the uniformly distributed cooling holes. That is, while the cooling holes improve cooling of turbine vane assembly 200, the effect of the cooling holes is greater than other arrangements of cooling holes.

In various embodiments, right leading cooling holes 236, right trailing cooling holes 238, left leading cooling holes 240, left trailing cooling holes 242, outer platform cooling holes 244, and inner platform cooling holes 246 are arranged according to the cartesian coordinate values of X, Y, and Z as set forth in Tables 1-4. These values are reference dimensions from a designed point on a midpoint of hole 210. While the values in Tables 1-4 are unitless, in various embodiments the distances represented from the midpoint of hole 210 may be scaled as a ratio with respect to the size of turbine vane assembly 200. In various embodiments, the distances may be measured in inches. Table 1 includes hole IDs and cartesian coordinates (X, Y, Z) for each right leading cooling hole 236 and right trailing cooling hole 238 hole from the midpoint of hole 210. That is, hole IDs 1-196 correspond to right leading cooling holes 236 and right trailing cooling holes 238. For example, the cooling holes in herring bone pattern 250 may correspond to hole IDs 140-157. As another example, the cooling holes in herring bone pattern 252 may correspond to hole IDs 158-175. Table 2 includes hole IDs and cartesian coordinates (X, Y, Z) for each left leading cooling hole 240 and left trailing cooling hole 242 hole from the midpoint of hole 210. That is, hole IDs 197-379 correspond to left leading cooling holes 240 and left trailing cooling holes 242. Table 3 includes hole IDs and cartesian coordinates (X, Y, Z) for each outer platform cooling hole 244 from the midpoint of hole 210. That is, hole IDs 380-497 correspond to outer platform cooling holes 244. Table 4 includes hole IDs and cartesian coordinates (X, Y, Z) for each inner platform cooling hole 246 from the midpoint of hole 210. That is, hole IDs 498-550 correspond to inner platform cooling holes 246.

TABLE 1

| Hole ID | X | Y | Z |
|---|---|---|---|
| 1 | 1.15002 | 1.43739 | 1.39073 |
| 2 | 1.14975 | 1.46908 | 1.53058 |
| 3 | 1.14968 | 1.49438 | 1.67189 |
| 4 | 1.14978 | 1.51381 | 1.81456 |
| 5 | 1.15006 | 1.52742 | 1.95856 |
| 6 | 1.15053 | 1.53486 | 2.10398 |
| 7 | 1.15121 | 1.53529 | 2.25102 |
| 8 | 1.15215 | 1.52739 | 2.39997 |
| 9 | 1.16036 | 1.57525 | 2.52167 |
| 10 | 1.12151 | 1.38854 | 1.44989 |
| 11 | 1.12317 | 1.42080 | 1.59005 |
| 12 | 1.12466 | 1.44677 | 1.73223 |
| 13 | 1.12594 | 1.46633 | 1.87474 |
| 14 | 1.12703 | 1.47965 | 2.01971 |
| 15 | 1.12789 | 1.48605 | 2.16516 |
| 16 | 1.12851 | 1.48478 | 2.31201 |
| 17 | 1.06626 | 1.26605 | 1.37967 |
| 18 | 1.06795 | 1.29903 | 1.52112 |
| 19 | 1.06914 | 1.32548 | 1.66341 |
| 20 | 1.06987 | 1.34601 | 1.80648 |
| 21 | 1.07017 | 1.36084 | 1.95029 |
| 22 | 1.07001 | 1.36978 | 2.09487 |
| 23 | 1.06936 | 1.37224 | 2.24030 |
| 24 | 1.06813 | 1.36721 | 2.38670 |
| 25 | 0.97083 | 1.11385 | 1.44149 |
| 26 | 0.97178 | 1.13725 | 1.58429 |
| 27 | 0.97242 | 1.15646 | 1.72689 |
| 28 | 0.97279 | 1.17216 | 1.86933 |
| 29 | 0.97292 | 1.18461 | 2.01163 |
| 30 | 0.97278 | 1.19367 | 2.15377 |
| 31 | 0.97235 | 1.19879 | 2.29573 |
| 32 | 0.97156 | 1.19906 | 2.43747 |
| 33 | 0.99576 | 1.26666 | 2.51994 |
| 34 | 0.93537 | 1.22954 | 2.61606 |
| 35 | 0.87164 | 0.95371 | 1.41528 |
| 36 | 0.86630 | 0.96103 | 1.55914 |
| 37 | 0.86035 | 0.96467 | 1.70299 |
| 38 | 0.85400 | 0.96595 | 1.84685 |
| 39 | 0.84743 | 0.96588 | 1.99070 |
| 40 | 0.84073 | 0.96503 | 2.13455 |
| 41 | 0.83392 | 0.96349 | 2.27841 |
| 42 | 0.82694 | 0.96091 | 2.42227 |
| 43 | 0.82592 | 0.99429 | 2.56617 |
| 44 | 0.78702 | 0.96426 | 2.61631 |
| 45 | 0.55807 | 1.42242 | 2.50121 |
| 46 | 0.55267 | 1.45070 | 2.56733 |
| 47 | 0.64508 | 0.66725 | 1.35005 |
| 48 | 0.66109 | 0.66725 | 1.51374 |
| 49 | 0.65850 | 0.66449 | 1.61381 |
| 50 | 0.65602 | 0.66221 | 1.71387 |
| 51 | 0.65373 | 0.66082 | 1.81391 |
| 52 | 0.65172 | 0.66069 | 1.91392 |
| 53 | 0.65004 | 0.66209 | 2.01390 |
| 54 | 0.64873 | 0.66519 | 2.11385 |
| 55 | 0.64783 | 0.67014 | 2.21376 |
| 56 | 0.64731 | 0.67685 | 2.31363 |
| 57 | 0.64714 | 0.68517 | 2.41346 |
| 58 | 0.69062 | 0.75667 | 2.49472 |
| 59 | 0.51886 | 0.58421 | 1.26978 |
| 60 | 0.53872 | 0.52258 | 1.43658 |
| 61 | 0.54489 | 0.52228 | 1.60204 |
| 62 | 0.54077 | 0.51462 | 1.69712 |
| 63 | 0.53699 | 0.50827 | 1.79219 |
| 64 | 0.53360 | 0.50347 | 1.88724 |
| 65 | 0.53068 | 0.50047 | 1.98226 |
| 66 | 0.52825 | 0.49940 | 2.07727 |
| 67 | 0.52637 | 0.50046 | 2.17224 |
| 68 | 0.52506 | 0.50375 | 2.26719 |
| 69 | 0.52436 | 0.50942 | 2.36212 |
| 70 | 0.52429 | 0.51752 | 2.45701 |
| 71 | 0.55475 | 0.59069 | 2.55128 |
| 72 | 0.40298 | 0.40701 | 1.36993 |
| 73 | 0.40474 | 0.39055 | 1.43704 |
| 74 | 0.40569 | 0.38425 | 1.51805 |
| 75 | 0.40643 | 0.38053 | 1.60261 |
| 76 | 0.40711 | 0.37765 | 1.68831 |
| 77 | 0.40773 | 0.37551 | 1.77504 |
| 78 | 0.40829 | 0.37406 | 1.86271 |

TABLE 1-continued

| Hole ID | X | Y | Z |
|---|---|---|---|
| 79 | 0.40440 | 0.36959 | 1.98593 |
| 80 | 0.40658 | 0.37096 | 2.07775 |
| 81 | 0.40873 | 0.37305 | 2.16867 |
| 82 | 0.41083 | 0.37593 | 2.25857 |
| 83 | 0.41289 | 0.37979 | 2.34723 |
| 84 | 0.41484 | 0.38584 | 2.43312 |
| 85 | 0.41915 | 0.40337 | 2.50000 |
| 86 | 0.42076 | 0.43009 | 2.56150 |
| 87 | 0.32422 | 0.27958 | 1.21427 |
| 88 | 0.32720 | 0.28359 | 1.31692 |
| 89 | 0.33136 | 0.28687 | 1.51209 |
| 90 | 0.33313 | 0.28697 | 1.65664 |
| 91 | 0.33539 | 0.28849 | 1.80202 |
| 92 | 0.33649 | 0.28939 | 1.87403 |
| 93 | 0.33839 | 0.29157 | 1.96333 |
| 94 | 0.34055 | 0.29396 | 2.10948 |
| 95 | 0.34174 | 0.29539 | 2.27545 |
| 96 | 0.34381 | 0.29931 | 2.43711 |
| 97 | 0.32138 | 0.31811 | 2.53866 |
| 98 | 0.25055 | 0.21075 | 1.24132 |
| 99 | 0.30169 | 0.20985 | 1.40305 |
| 100 | 0.30765 | 0.20722 | 1.57777 |
| 101 | 0.30786 | 0.20824 | 1.72121 |
| 102 | 0.30848 | 0.20998 | 1.86942 |
| 103 | 0.30915 | 0.21243 | 1.93724 |
| 104 | 0.31006 | 0.21517 | 2.02786 |
| 105 | 0.31152 | 0.21841 | 2.17006 |
| 106 | 0.31368 | 0.22395 | 2.31433 |
| 107 | 0.30337 | 0.23697 | 2.48603 |
| 108 | 0.21714 | 0.25695 | 2.67809 |
| 109 | 0.26265 | 0.12834 | 1.22147 |
| 110 | 0.30989 | 0.12667 | 1.37425 |
| 111 | 0.31104 | 0.12417 | 1.51295 |
| 112 | 0.31035 | 0.12459 | 1.65553 |
| 113 | 0.30987 | 0.12624 | 1.79841 |
| 114 | 0.30977 | 0.12829 | 1.93635 |
| 115 | 0.30944 | 0.13191 | 2.00643 |
| 116 | 0.30970 | 0.13374 | 2.09528 |
| 117 | 0.31017 | 0.13840 | 2.22945 |
| 118 | 0.31140 | 0.14132 | 2.36711 |
| 119 | 0.30348 | 0.14146 | 2.48649 |
| 120 | 0.27437 | 0.13407 | 2.58281 |
| 121 | 0.22384 | 0.11908 | 2.67218 |
| 122 | 0.29410 | 0.03760 | 1.21406 |
| 123 | 0.33069 | 0.04310 | 1.40662 |
| 124 | 0.33013 | 0.04495 | 1.56307 |
| 125 | 0.33023 | 0.04518 | 1.70649 |
| 126 | 0.33051 | 0.04551 | 1.85664 |
| 127 | 0.32998 | 0.04839 | 2.00666 |
| 128 | 0.32891 | 0.05170 | 2.06280 |
| 129 | 0.32872 | 0.05533 | 2.22021 |
| 130 | 0.32705 | 0.06369 | 2.36906 |
| 131 | 0.32170 | 0.06011 | 2.50375 |
| 132 | 0.28758 | 0.05226 | 2.60496 |
| 133 | 0.25347 | 0.03956 | 2.66336 |
| 134 | 0.36155 | −0.01724 | 2.54140 |
| 135 | 0.32409 | −0.02059 | 2.62288 |
| 136 | 0.37692 | −0.06125 | 2.61855 |
| 137 | 0.32433 | −0.07300 | 2.68242 |
| 138 | 0.43048 | −0.10007 | 2.67136 |
| 139 | 0.50263 | −0.09749 | 2.64646 |
| 140 | 0.45489 | −0.08365 | 1.26842 |
| 141 | 0.45473 | −0.08202 | 1.34302 |
| 142 | 0.45458 | −0.08051 | 1.41772 |
| 143 | 0.45446 | −0.07915 | 1.49255 |
| 144 | 0.45437 | −0.07796 | 1.56752 |
| 145 | 0.45430 | −0.07691 | 1.64262 |
| 146 | 0.45426 | −0.07602 | 1.71784 |
| 147 | 0.45423 | −0.07526 | 1.79318 |
| 148 | 0.45422 | −0.07459 | 1.86861 |
| 149 | 0.45422 | −0.07401 | 1.94410 |
| 150 | 0.45504 | −0.07368 | 2.04274 |
| 151 | 0.45419 | −0.07285 | 2.11945 |
| 152 | 0.45335 | −0.07205 | 2.19615 |
| 153 | 0.45251 | −0.07132 | 2.27277 |
| 154 | 0.45169 | −0.07064 | 2.34936 |
| 155 | 0.45088 | −0.07004 | 2.42587 |
| 156 | 0.45008 | −0.06954 | 2.50231 |
| 157 | 0.44931 | −0.06917 | 2.57863 |
| 158 | 0.67997 | −0.03692 | 1.29260 |
| 159 | 0.68252 | −0.03643 | 1.37057 |
| 160 | 0.68529 | −0.03601 | 1.44854 |
| 161 | 0.68813 | −0.03560 | 1.52651 |
| 162 | 0.69090 | −0.03517 | 1.60447 |
| 163 | 0.69349 | −0.03470 | 1.68244 |
| 164 | 0.69584 | −0.03415 | 1.76041 |
| 165 | 0.69791 | −0.03353 | 1.83838 |
| 166 | 0.69966 | −0.03281 | 1.91636 |
| 167 | 0.70106 | −0.03200 | 1.99435 |
| 168 | 0.70211 | −0.03109 | 2.07234 |
| 169 | 0.70280 | −0.03009 | 2.15033 |
| 170 | 0.70316 | −0.02899 | 2.22832 |
| 171 | 0.70322 | −0.02780 | 2.30632 |
| 172 | 0.70302 | −0.02654 | 2.38433 |
| 173 | 0.70261 | −0.02523 | 2.46234 |
| 174 | 0.70208 | −0.02388 | 2.54035 |
| 175 | 0.70154 | −0.02253 | 2.61835 |
| 176 | 0.84478 | 0.12722 | 1.32942 |
| 177 | 0.84209 | 0.12567 | 1.40738 |
| 178 | 0.84027 | 0.12448 | 1.48534 |
| 179 | 0.83911 | 0.12358 | 1.56332 |
| 180 | 0.83839 | 0.12284 | 1.64132 |
| 181 | 0.83796 | 0.12222 | 1.71932 |
| 182 | 0.83768 | 0.12168 | 1.79733 |
| 183 | 0.83743 | 0.12113 | 1.87533 |
| 184 | 0.83716 | 0.12058 | 1.95333 |
| 185 | 0.83679 | 0.12000 | 2.03133 |
| 186 | 0.83632 | 0.11936 | 2.10933 |
| 187 | 0.83573 | 0.11868 | 2.18732 |
| 188 | 0.83504 | 0.11796 | 2.26531 |
| 189 | 0.83432 | 0.11722 | 2.34331 |
| 190 | 0.83362 | 0.11651 | 2.42130 |
| 191 | 0.83307 | 0.11585 | 2.49930 |
| 192 | 0.78376 | 0.05261 | 2.55457 |
| 193 | 0.78414 | 0.05350 | 2.61845 |
| 194 | 1.17417 | 1.17362 | 2.55211 |
| 195 | 1.18717 | 1.21324 | 2.61570 |
| 196 | 1.22006 | 1.35817 | 2.55292 |

TABLE 2

| Hole ID | X | Y | Z |
|---|---|---|---|
| 197 | 1.15002 | 1.43739 | 1.39073 |
| 198 | 1.14975 | 1.46908 | 1.53058 |
| 199 | 1.14968 | 1.49438 | 1.67189 |
| 200 | 1.14978 | 1.51381 | 1.81456 |
| 201 | 1.15006 | 1.52742 | 1.95856 |
| 202 | 1.15053 | 1.53486 | 2.10398 |
| 203 | 1.15121 | 1.53529 | 2.25102 |
| 204 | 1.15215 | 1.52739 | 2.39997 |
| 205 | 1.12467 | 1.50245 | 2.53348 |
| 206 | 1.12151 | 1.38854 | 1.44989 |
| 207 | 1.12317 | 1.42080 | 1.59005 |
| 208 | 1.12466 | 1.44677 | 1.73223 |
| 209 | 1.12594 | 1.46633 | 1.87474 |
| 210 | 1.12703 | 1.47965 | 2.01971 |
| 211 | 1.12789 | 1.48605 | 2.16516 |
| 212 | 1.12851 | 1.48478 | 2.31201 |
| 213 | 1.06626 | 1.26605 | 1.37967 |
| 214 | 1.06795 | 1.29903 | 1.52112 |
| 215 | 1.06914 | 1.32548 | 1.66341 |
| 216 | 1.06987 | 1.34601 | 1.80648 |
| 217 | 1.07017 | 1.36084 | 1.95029 |
| 218 | 1.07001 | 1.36978 | 2.09487 |
| 219 | 1.06936 | 1.37224 | 2.24030 |
| 220 | 1.06813 | 1.36721 | 2.38670 |
| 221 | 0.99623 | 1.13391 | 1.25178 |
| 222 | 0.97083 | 1.11385 | 1.44149 |
| 223 | 0.97178 | 1.13725 | 1.58429 |
| 224 | 0.97242 | 1.15646 | 1.72689 |
| 225 | 0.97279 | 1.17216 | 1.86933 |
| 226 | 0.97292 | 1.18461 | 2.01163 |

TABLE 2-continued

| Hole ID | X | Y | Z |
|---|---|---|---|
| 227 | 0.97278 | 1.19367 | 2.15377 |
| 228 | 0.97235 | 1.19879 | 2.29573 |
| 229 | 0.97156 | 1.19906 | 2.43747 |
| 230 | 0.99576 | 1.26666 | 2.51994 |
| 231 | 0.87164 | 0.95371 | 1.41528 |
| 232 | 0.86630 | 0.96103 | 1.55914 |
| 233 | 0.86035 | 0.96467 | 1.70299 |
| 234 | 0.85400 | 0.96595 | 1.84685 |
| 235 | 0.84743 | 0.96588 | 1.99070 |
| 236 | 0.84073 | 0.96503 | 2.13455 |
| 237 | 0.83392 | 0.96349 | 2.27841 |
| 238 | 0.82694 | 0.96091 | 2.42227 |
| 239 | 0.64508 | 0.66725 | 1.35005 |
| 240 | 0.66109 | 0.66725 | 1.51374 |
| 241 | 0.65850 | 0.66450 | 1.61381 |
| 242 | 0.65602 | 0.66221 | 1.71387 |
| 243 | 0.65373 | 0.66081 | 1.81391 |
| 244 | 0.65172 | 0.66068 | 1.91392 |
| 245 | 0.65004 | 0.66208 | 2.01390 |
| 246 | 0.64873 | 0.66521 | 2.11385 |
| 247 | 0.64783 | 0.67014 | 2.21376 |
| 248 | 0.64731 | 0.67684 | 2.31363 |
| 249 | 0.64714 | 0.68516 | 2.41346 |
| 250 | 0.69062 | 0.75667 | 2.49472 |
| 251 | 0.48534 | 0.48602 | 2.53142 |
| 252 | 0.46877 | 0.51359 | 2.60548 |
| 253 | 0.51886 | 0.58421 | 1.26978 |
| 254 | 0.53872 | 0.52259 | 1.43658 |
| 255 | 0.54140 | 0.52141 | 1.51936 |
| 256 | 0.54489 | 0.52227 | 1.60204 |
| 257 | 0.54077 | 0.51462 | 1.69712 |
| 258 | 0.53699 | 0.50827 | 1.79219 |
| 259 | 0.53360 | 0.50348 | 1.88724 |
| 260 | 0.53068 | 0.50046 | 1.98226 |
| 261 | 0.52825 | 0.49940 | 2.07727 |
| 262 | 0.52637 | 0.50045 | 2.17224 |
| 263 | 0.52506 | 0.50375 | 2.26719 |
| 264 | 0.52436 | 0.50942 | 2.36212 |
| 265 | 0.52429 | 0.51752 | 2.45701 |
| 266 | 0.54210 | 0.57689 | 2.55753 |
| 267 | 0.61531 | 0.65317 | 2.50560 |
| 268 | 0.62168 | 0.69360 | 2.57267 |
| 269 | 0.40298 | 0.40701 | 1.36993 |
| 270 | 0.40474 | 0.39055 | 1.43704 |
| 271 | 0.40569 | 0.38425 | 1.51805 |
| 272 | 0.40643 | 0.38053 | 1.60261 |
| 273 | 0.40711 | 0.37765 | 1.68831 |
| 274 | 0.40773 | 0.37551 | 1.77504 |
| 275 | 0.40829 | 0.37406 | 1.86271 |
| 276 | 0.40440 | 0.36959 | 1.98593 |
| 277 | 0.40658 | 0.37096 | 2.07775 |
| 278 | 0.40873 | 0.37305 | 2.16867 |
| 279 | 0.41083 | 0.37593 | 2.25857 |
| 280 | 0.41289 | 0.37979 | 2.34723 |
| 281 | 0.41484 | 0.38584 | 2.43312 |
| 282 | 0.25905 | 0.29639 | 1.24564 |
| 283 | 0.30956 | 0.29280 | 1.36502 |
| 284 | 0.32681 | 0.28865 | 1.52291 |
| 285 | 0.32865 | 0.28898 | 1.66609 |
| 286 | 0.33112 | 0.29096 | 1.81046 |
| 287 | 0.33194 | 0.29159 | 1.86700 |
| 288 | 0.33410 | 0.29422 | 1.95621 |
| 289 | 0.33622 | 0.29652 | 2.10105 |
| 290 | 0.33744 | 0.29795 | 2.26614 |
| 291 | 0.33644 | 0.30293 | 2.41973 |
| 292 | 0.31841 | 0.31919 | 2.53209 |
| 293 | 0.24610 | 0.21037 | 1.24357 |
| 294 | 0.29805 | 0.20953 | 1.41300 |
| 295 | 0.30261 | 0.20730 | 1.58977 |
| 296 | 0.30286 | 0.20851 | 1.73149 |
| 297 | 0.30352 | 0.21040 | 1.87805 |
| 298 | 0.30409 | 0.21271 | 1.92915 |
| 299 | 0.30500 | 0.21552 | 2.01968 |
| 300 | 0.30642 | 0.21873 | 2.16054 |
| 301 | 0.30861 | 0.22453 | 2.30255 |
| 302 | 0.30007 | 0.23709 | 2.47757 |
| 303 | 0.19856 | 0.25908 | 2.67766 |
| 304 | 0.24865 | 0.12402 | 1.22592 |

TABLE 2-continued

| Hole ID | X | Y | Z |
|---|---|---|---|
| 305 | 0.30566 | 0.12581 | 1.38414 |
| 306 | 0.30608 | 0.12312 | 1.52516 |
| 307 | 0.30540 | 0.12373 | 1.66630 |
| 308 | 0.30492 | 0.12554 | 1.80738 |
| 309 | 0.30483 | 0.12769 | 1.94532 |
| 310 | 0.30446 | 0.13116 | 1.99849 |
| 311 | 0.30471 | 0.13290 | 2.08652 |
| 312 | 0.30509 | 0.13793 | 2.21974 |
| 313 | 0.30634 | 0.14041 | 2.35740 |
| 314 | 0.29990 | 0.13995 | 2.47959 |
| 315 | 0.27072 | 0.13259 | 2.57924 |
| 316 | 0.21892 | 0.11692 | 2.67089 |
| 317 | 0.28468 | 0.03469 | 1.21678 |
| 318 | 0.33069 | 0.04310 | 1.40662 |
| 319 | 0.33013 | 0.04495 | 1.56307 |
| 320 | 0.33023 | 0.04518 | 1.70649 |
| 321 | 0.33051 | 0.04551 | 1.85664 |
| 322 | 0.32998 | 0.04839 | 2.00665 |
| 323 | 0.32891 | 0.05170 | 2.06280 |
| 324 | 0.32872 | 0.05533 | 2.22021 |
| 325 | 0.32705 | 0.06369 | 2.36906 |
| 326 | 0.32170 | 0.06011 | 2.50375 |
| 327 | 0.28757 | 0.05226 | 2.60496 |
| 328 | 0.21388 | 0.01457 | 2.70061 |
| 329 | 0.45724 | −0.09924 | 1.28177 |
| 330 | 0.45545 | −0.08734 | 1.35673 |
| 331 | 0.45520 | −0.08571 | 1.44049 |
| 332 | 0.45498 | −0.08425 | 1.52439 |
| 333 | 0.45479 | −0.08298 | 1.60845 |
| 334 | 0.45463 | −0.08189 | 1.69267 |
| 335 | 0.45449 | −0.08096 | 1.77702 |
| 336 | 0.45437 | −0.08015 | 1.86147 |
| 337 | 0.45426 | −0.07945 | 1.94602 |
| 338 | 0.45599 | −0.07936 | 2.06400 |
| 339 | 0.45515 | −0.07851 | 2.14785 |
| 340 | 0.45431 | −0.07771 | 2.23162 |
| 341 | 0.45349 | −0.07698 | 2.31534 |
| 342 | 0.45267 | −0.07632 | 2.39899 |
| 343 | 0.45188 | −0.07577 | 2.48255 |
| 344 | 0.45119 | −0.07591 | 2.56552 |
| 345 | 0.45290 | −0.09138 | 2.64202 |
| 346 | 0.68623 | −0.03856 | 1.27010 |
| 347 | 0.68631 | −0.03970 | 1.35825 |
| 348 | 0.68681 | −0.04100 | 1.44680 |
| 349 | 0.68744 | −0.04234 | 1.53550 |
| 350 | 0.68800 | −0.04367 | 1.62412 |
| 351 | 0.68835 | −0.04491 | 1.71254 |
| 352 | 0.68840 | −0.04603 | 1.80065 |
| 353 | 0.68807 | −0.04702 | 1.88838 |
| 354 | 0.68734 | −0.04784 | 1.97571 |
| 355 | 0.68671 | −0.04798 | 2.09932 |
| 356 | 0.68601 | −0.04772 | 2.18563 |
| 357 | 0.68491 | −0.04732 | 2.27231 |
| 358 | 0.68344 | −0.04678 | 2.35931 |
| 359 | 0.68167 | −0.04613 | 2.44660 |
| 360 | 0.67966 | −0.04539 | 2.53409 |
| 361 | 0.67888 | −0.04510 | 2.62047 |
| 362 | 0.85332 | 0.13074 | 1.32957 |
| 363 | 0.85058 | 0.12917 | 1.40753 |
| 364 | 0.84870 | 0.12796 | 1.48549 |
| 365 | 0.84748 | 0.12702 | 1.56348 |
| 366 | 0.84670 | 0.12626 | 1.64147 |
| 367 | 0.84621 | 0.12562 | 1.71947 |
| 368 | 0.84589 | 0.12506 | 1.79747 |
| 369 | 0.84561 | 0.12450 | 1.87548 |
| 370 | 0.84532 | 0.12395 | 1.95348 |
| 371 | 0.84495 | 0.12336 | 2.03148 |
| 372 | 0.84449 | 0.12273 | 2.10948 |
| 373 | 0.84392 | 0.12206 | 2.18747 |
| 374 | 0.84328 | 0.12135 | 2.26547 |
| 375 | 0.84261 | 0.12064 | 2.34346 |
| 376 | 0.84198 | 0.11995 | 2.42146 |
| 377 | 0.84150 | 0.11932 | 2.49946 |
| 378 | 0.79153 | 0.05392 | 2.55424 |
| 379 | 0.79277 | 0.05511 | 2.61666 |

TABLE 3

| Hole ID | X | Y | Z |
|---|---|---|---|
| 380 | 0.10836 | 1.68534 | 2.73083 |
| 381 | 0.10601 | 1.48181 | 2.75402 |
| 382 | 0.09613 | 1.26502 | 2.76260 |
| 383 | 0.10072 | 1.02619 | 2.77576 |
| 384 | 0.10651 | 0.74412 | 2.80069 |
| 385 | 0.11122 | 0.42613 | 2.80254 |
| 386 | 0.10610 | 0.24686 | 2.80037 |
| 387 | 0.09341 | −0.09759 | 2.78766 |
| 388 | 0.09964 | −0.28371 | 2.77295 |
| 389 | 0.09596 | −0.54589 | 2.74321 |
| 390 | 0.08507 | −0.80623 | 2.70556 |
| 391 | 0.09956 | −1.02104 | 2.68387 |
| 392 | 0.09965 | −1.26353 | 2.64229 |
| 393 | 0.09965 | −1.50592 | 2.59405 |
| 394 | 0.31037 | 1.55118 | 2.70887 |
| 395 | 0.24973 | 1.42980 | 2.70368 |
| 396 | 0.20497 | 1.30700 | 2.69286 |
| 397 | 0.18179 | 1.18043 | 2.68842 |
| 398 | 0.19440 | 1.03198 | 2.70033 |
| 399 | 0.24080 | 0.91315 | 2.71796 |
| 400 | 0.30890 | −0.38659 | 2.71196 |
| 401 | 0.24429 | −0.48995 | 2.68373 |
| 402 | 0.19509 | −0.60133 | 2.66086 |
| 403 | 0.17207 | −0.71905 | 2.64243 |
| 404 | 0.18578 | −0.86414 | 2.63102 |
| 405 | 0.22951 | −0.97350 | 2.62447 |
| 406 | 0.30352 | −1.06850 | 2.63119 |
| 407 | 0.39535 | −1.14270 | 2.66018 |
| 408 | 1.39569 | 2.63987 | 2.41795 |
| 409 | 1.39502 | 2.40679 | 2.46836 |
| 410 | 1.39487 | 2.17357 | 2.51285 |
| 411 | 1.39481 | 1.93931 | 2.55154 |
| 412 | 1.39486 | 1.70413 | 2.58441 |
| 413 | 1.39517 | 1.46826 | 2.61150 |
| 414 | 1.39541 | 1.23178 | 2.63283 |
| 415 | 1.39541 | 0.99487 | 2.64806 |
| 416 | 1.39520 | 0.75756 | 2.65718 |
| 417 | 1.39495 | 0.48705 | 2.66042 |
| 418 | 1.39653 | 0.20713 | 2.65574 |
| 419 | 1.39858 | −0.11715 | 2.64008 |
| 420 | 1.40113 | −0.38507 | 2.61900 |
| 421 | 1.39811 | −0.62855 | 2.59337 |
| 422 | 0.40430 | 0.44817 | 2.83012 |
| 423 | 0.31154 | 0.22156 | 2.80351 |
| 424 | 0.35268 | 0.04589 | 2.78855 |
| 425 | 0.40275 | −0.12533 | 2.76260 |
| 426 | 0.45102 | −0.28072 | 2.68595 |
| 427 | 0.49575 | 0.62228 | 2.82919 |
| 428 | 0.51499 | 0.45038 | 2.82592 |
| 429 | 0.55656 | 0.28373 | 2.80601 |
| 430 | 0.60106 | 0.12344 | 2.78317 |
| 431 | 0.66977 | 0.00941 | 2.73452 |
| 432 | 0.76956 | 0.76183 | 2.76363 |
| 433 | 0.82448 | 0.61455 | 2.76447 |
| 434 | 0.88565 | 0.52149 | 2.74129 |
| 435 | 0.95914 | 0.45537 | 2.70554 |
| 436 | 1.06855 | 1.30772 | 2.68215 |
| 437 | 1.10763 | 1.11852 | 2.69949 |
| 438 | 1.09354 | 0.88438 | 2.70153 |
| 439 | 1.11496 | 0.73441 | 2.68344 |
| 440 | 1.32731 | 1.61536 | 2.60629 |
| 441 | 1.32208 | 1.43979 | 2.62315 |
| 442 | 1.32363 | 1.16071 | 2.62745 |
| 443 | 0.98341 | −0.75621 | 2.64335 |
| 444 | 1.02275 | −0.90586 | 2.62780 |
| 445 | 1.11623 | −0.36437 | 2.65950 |
| 446 | 1.18157 | −0.56935 | 2.64887 |
| 447 | 1.26577 | −0.78285 | 2.57315 |
| 448 | 1.24869 | −0.10476 | 2.66739 |
| 449 | 1.25745 | −0.30183 | 2.65570 |
| 450 | 1.27175 | −0.49852 | 2.63156 |
| 451 | 1.33401 | −0.67879 | 2.57716 |
| 452 | 0.42063 | 2.05018 | 2.68571 |
| 453 | 0.41858 | 1.85860 | 2.69608 |
| 454 | 0.44533 | 1.64300 | 2.67089 |
| 455 | 0.57857 | 2.14946 | 2.66171 |
| 456 | 0.59046 | 1.96678 | 2.67727 |
| 457 | 0.73587 | 2.23322 | 2.61888 |

TABLE 3-continued

| Hole ID | X | Y | Z |
|---|---|---|---|
| 458 | 0.82632 | 2.10181 | 2.58921 |
| 459 | 0.86293 | 2.38475 | 2.56286 |
| 460 | 1.02863 | 2.50487 | 2.49298 |
| 461 | 1.16412 | 2.57230 | 2.40791 |
| 462 | −0.01566 | 0.82305 | 2.84091 |
| 463 | −0.01566 | 0.92893 | 2.83685 |
| 464 | −0.01567 | 1.03476 | 2.83163 |
| 465 | −0.01566 | 1.14052 | 2.82525 |
| 466 | −0.01567 | 1.24621 | 2.81772 |
| 467 | −0.01566 | 1.35181 | 2.80904 |
| 468 | −0.01566 | 1.45730 | 2.79921 |
| 469 | −0.01566 | −0.97242 | 2.73344 |
| 470 | −0.01566 | −0.86760 | 2.74896 |
| 471 | −0.01566 | −0.76263 | 2.76335 |
| 472 | −0.01566 | −0.65751 | 2.77658 |
| 473 | −0.01566 | −0.55223 | 2.78867 |
| 474 | −0.01567 | −0.44685 | 2.79961 |
| 475 | −0.01566 | −0.34134 | 2.80940 |
| 476 | 0.28374 | −1.65244 | 2.61529 |
| 477 | 0.20108 | −1.71473 | 2.59788 |
| 478 | 1.00064 | −1.11222 | 2.64514 |
| 479 | 0.94604 | −1.15336 | 2.64620 |
| 480 | 0.72231 | −1.32195 | 2.64675 |
| 481 | 0.82200 | −1.24683 | 2.65272 |
| 482 | 1.21107 | −0.95365 | 2.62015 |
| 483 | 1.12721 | −1.01684 | 2.63383 |
| 484 | 1.46238 | −0.62487 | 2.66179 |
| 485 | 1.47007 | −0.48246 | 2.67521 |
| 486 | 1.47007 | 0.72303 | 2.72018 |
| 487 | 1.47007 | 0.97395 | 2.71134 |
| 488 | 1.47007 | 1.22412 | 2.69938 |
| 489 | 1.47007 | 2.65487 | 2.48796 |
| 490 | 1.38154 | −0.82519 | 2.62151 |
| 491 | 1.29835 | −0.88788 | 2.59570 |
| 492 | 1.33953 | 2.84276 | 2.40694 |
| 493 | 1.25480 | 2.77778 | 2.41692 |
| 494 | 1.16431 | 2.72417 | 2.46568 |
| 495 | 1.08519 | 2.67437 | 2.50126 |
| 496 | 0.25191 | 2.09023 | 2.73185 |
| 497 | 0.16615 | 2.02326 | 2.73905 |

TABLE 4

| Hole ID | X | Y | Z |
|---|---|---|---|
| 498 | 0.28920 | 1.40537 | 1.05181 |
| 499 | 0.20020 | 1.29508 | 1.05270 |
| 500 | 0.13753 | 1.17280 | 1.05976 |
| 501 | 0.10755 | 1.03961 | 1.06143 |
| 502 | 0.13264 | 0.86933 | 1.07250 |
| 503 | 0.15827 | 0.74774 | 1.06681 |
| 504 | 0.21818 | 0.62348 | 1.07599 |
| 505 | 0.31775 | 0.53230 | 1.12265 |
| 506 | 0.21665 | −0.19761 | 1.04984 |
| 507 | 0.15796 | −0.30704 | 1.03929 |
| 508 | 0.11805 | −0.42112 | 1.02581 |
| 509 | 0.10194 | −0.58123 | 0.99999 |
| 510 | 0.13386 | −0.69230 | 0.98974 |
| 511 | 0.18470 | −0.80822 | 0.97592 |
| 512 | 0.26082 | −0.90786 | 0.97654 |
| 513 | 0.35343 | −1.02096 | 0.99459 |
| 514 | 0.50447 | −0.03108 | 1.14419 |
| 515 | 0.48392 | 0.11384 | 1.09839 |
| 516 | 0.50467 | 0.37173 | 1.11895 |
| 517 | 0.51238 | 0.57807 | 1.17478 |
| 518 | 0.75908 | 0.21331 | 1.16557 |
| 519 | 0.78926 | 0.37404 | 1.15180 |
| 520 | 0.79089 | 0.59786 | 1.16438 |
| 521 | 0.80036 | 0.76413 | 1.19580 |
| 522 | 1.05899 | 0.57465 | 1.18420 |
| 523 | 1.01907 | 0.83798 | 1.16602 |
| 524 | 1.01906 | 1.11495 | 1.17575 |
| 525 | 0.54076 | 1.55496 | 1.10233 |
| 526 | 0.49001 | 1.69509 | 1.01539 |
| 527 | 0.84319 | 1.86333 | 1.05729 |

TABLE 4-continued

| Hole ID | X | Y | Z |
|---|---|---|---|
| 528 | 0.78045 | 1.98494 | 1.01029 |
| 529 | 0.89693 | 2.00292 | 1.02404 |
| 530 | 0.93274 | −0.68389 | 1.10579 |
| 531 | 1.14741 | −0.47626 | 1.11873 |
| 532 | 1.25302 | −0.38874 | 1.13576 |
| 533 | 1.38010 | −0.33042 | 1.12834 |
| 534 | 1.18168 | 1.77412 | 1.10381 |
| 535 | 1.40178 | 1.71679 | 1.07747 |
| 536 | 1.38590 | 1.88934 | 1.04949 |
| 537 | 1.23368 | −0.05962 | 1.16337 |
| 538 | 1.40006 | 0.10895 | 1.15525 |
| 539 | 1.16707 | 0.09747 | 1.18857 |
| 540 | 1.30920 | 0.34005 | 1.18129 |
| 541 | 1.33353 | 0.63949 | 1.18725 |
| 542 | 1.30535 | 1.05671 | 1.17563 |
| 543 | 1.35381 | 2.27675 | 0.98205 |
| 544 | 1.00217 | 1.94686 | 1.12082 |
| 545 | 1.15774 | 0.77766 | 1.19278 |
| 546 | 1.18335 | 0.91919 | 1.17476 |
| 547 | 1.22604 | 1.17512 | 1.15499 |
| 548 | 1.24450 | 1.44341 | 1.12886 |
| 549 | 0.10590 | 1.57963 | 0.91632 |
| 550 | 1.38741 | 2.10952 | 1.00726 |

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B. A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A turbine vane assembly for a gas turbine engine, comprising:

- a turbine vane including a leading edge, a pressure edge, a suction edge, and a trailing edge;
- a core defined by the turbine vane;
- an outer platform end wall connected to the turbine vane, the outer platform end wall defining an interior space, the interior space being in fluid communication with the core; and
- a plurality of cooling holes formed in the turbine vane, the plurality of cooling holes being in fluid communication with the core, wherein the plurality of cooling holes are located in the vane according to coordinates of Table 1, wherein the coordinates of Table 1 are distances from a point of origin on the turbine vane assembly.

2. The turbine vane assembly of claim 1, wherein the turbine vane assembly is a first stage turbine vane assembly of a high pressure turbine of the gas turbine engine.

3. The turbine vane assembly of claim 1, further comprising:

- a second turbine vane including a second leading edge, a second pressure edge, a second suction edge, and a second trailing edge, the second turbine vane connected to the outer platform end wall;

a second core defined by the second turbine vane, the second core in being fluid communication with the interior space; and a second plurality of cooling holes formed in the second turbine vane, the second plurality of cooling holes in being fluid communication with the second core.

4. The turbine vane assembly of claim 3, further comprising:

an inner platform end wall connected to the turbine vane and the second turbine vane opposite the outer platform end wall, the inner platform end wall defining a second interior space, wherein the second interior space is in fluid communication with the core and the second core.

5. The turbine vane assembly of claim 4, further comprising:

a third plurality of cooling holes formed in the outer platform end wall, the third plurality of cooling holes being in fluid communication with the interior space.

6. The turbine vane assembly of claim 5, further comprising:

a fourth plurality of cooling holes formed in the inner platform end wall, the fourth plurality of cooling holes being in fluid communication with the second interior space.

7. The turbine vane assembly of claim 6, wherein the fourth plurality of cooling holes are located in the inner platform end wall according to coordinates of Table 4, wherein the coordinates of Table 4 are distances from a point of origin on the turbine vane assembly.

8. The turbine vane assembly of claim 5, wherein the third plurality of cooling holes are located in the outer platform according to coordinates of Table 3, wherein the coordinates of Table 3 are distances from a point of origin on the turbine vane assembly.

9. The turbine vane assembly of claim 3, wherein the second plurality of cooling holes are located in the second turbine vane according to coordinates of Table 2, wherein the coordinates of Table 2 are distances from a point of origin on the turbine vane assembly.

10. A component for a gas turbine engine, comprising:

a first turbine vane including first outer walls and a first core, the first core being partially defined by the first outer walls;

a second turbine vane including second outer walls and a second core, the second core being partially defined by the second outer walls;

an outer platform end wall connected to the first turbine vane and the second turbine vane;

an inner platform end wall connected to the first turbine vane and the second turbine vane opposite the outer platform end wall;

a first plurality of cooling holes extending through the first outer walls into the first core, wherein the first plurality of cooling holes are located in the first turbine vane according to coordinates of Table 1, wherein the coordinates of Table 1 are distances from a point of origin on the component; and a second plurality of cooling holes extending through the second outer walls into the second core.

11. The component of claim 10, wherein the outer platform end wall further comprises:

a first interior space, the first interior space being in fluid communication with the first core and the second core; and a third plurality of cooling holes extending through the outer platform end wall and into the first interior space.

12. The component of claim 11, wherein the third plurality of cooling holes are located in the outer platform end wall according to coordinates of Table 3, wherein the coordinates of Table 3 are distances from a point of origin on the component.

13. The component of claim 11, wherein the inner platform end wall further comprises:

a second interior space, the second interior space being in fluid communication with the first core and the second core; and a fourth plurality of cooling holes extending through the inner platform end wall and into the first interior space.

14. The component of claim 13, wherein the fourth plurality of cooling holes are located in the inner platform end wall according to coordinates of Table 4, wherein the coordinates of Table 4 are distances from a point of origin on the component.

15. The component of claim 10, wherein the second plurality of cooling holes are located in the second turbine vane according to coordinates of Table 2, wherein the coordinates of Table 2 are distances from a point of origin on the turbine vane assembly.

16. A method of cooling a turbine vane assembly of a gas turbine engine, comprising:

receiving a turbine vane assembly including a first turbine vane, a second turbine vane, an outer platform end wall, and an inner platform end wall, the first turbine vane disposed adjacent the second turbine vane, the outer platform end wall connected to the first turbine vane and the second turbine vane, and the inner platform end wall connected to the first turbine vane and the second turbine vane opposite the outer platform end wall;

forming a first plurality of cooling holes in a first turbine vane, wherein the first plurality of cooling holes are located in the first turbine vane according to coordinates of Table 1, wherein the coordinates of Table 1 are distances from a point of origin in the turbine vane assembly; and forming a second plurality of cooling holes in a second turbine vane that is adjacent the first turbine vane, wherein the second plurality of cooling holes are located in the first turbine vane according to coordinates of Table 2, wherein the coordinates of Table 2 are distances from a point of origin in the turbine vane assembly.

17. The method of claim 16, further comprising:

forming a third plurality of cooling holes in the outer platform end wall, wherein the third plurality of cooling holes are located in the outer end wall according to coordinates of Table 3, wherein the coordinates of Table 3 are distances from a point of origin in the turbine vane assembly.

18. The method of claim 16, further comprising:

forming a fourth plurality of cooling holes in the inner platform end wall, wherein the fourth plurality of cooling holes are located in the inner platform end wall according to coordinates of Table 4, wherein the coordinates of Table 4 are distances from a point of origin in the turbine vane assembly.

* * * * *